United States Patent [19]

Kucherry, Sr.

[11] Patent Number: 5,293,916
[45] Date of Patent: Mar. 15, 1994

[54] LOG DEBARKING CHAIN FLAIL AND APPARATUS

[76] Inventor: James D. Kucherry, Sr., HCR 61, Box 46, Bonners Ferry, Id. 83805

[21] Appl. No.: 15,815

[22] Filed: Feb. 10, 1993

[51] Int. Cl.⁵ ............................................. B27L 1/00
[52] U.S. Cl. .................................. 144/208 J; 59/84; 144/2 Z
[58] Field of Search .............. 144/208 R, 208 J, 2 Z; 51/382, 334; 59/78, 84; 241/189 R, 191, 193, 194

[56] References Cited

U.S. PATENT DOCUMENTS

| | | | |
|---|---|---|---|
| 1,283,070 | 10/1918 | Callender | 144/208 J |
| 1,351,711 | 0/1920 | White | 241/193 |
| 1,462,415 | 0/1923 | Kober | 144/208.5 |
| 1,663,794 | 3/1928 | Clowes | 144/208 J |
| 1,670,723 | 0/1928 | Hummel | 144/208 J |
| 1,759,188 | 5/1930 | Davidson | 144/208 J |
| 1,883,000 | 10/1932 | Senft | 59/84 |
| 2,432,459 | 0/1947 | Timmerman | 17/18 |
| 2,938,326 | 0/1960 | Lundell | 241/193 |
| 3,411,279 | 0/1968 | Panek et al. | 56/294 |
| 3,422,612 | 0/1969 | Panek et al. | 56/294 |
| 3,627,010 | 0/1971 | Rueff | 56/294 |
| 3,715,884 | 2/1973 | Janders | 59/84 |
| 4,129,285 | 12/1978 | Graham | 59/84 |
| 4,368,764 | 0/1983 | Peterson et al. | 144/208 J |
| 4,572,258 | 2/1986 | Mischel | 144/2 Z |
| 4,682,467 | 7/1987 | Waltemyer et al. | 59/84 |

FOREIGN PATENT DOCUMENTS 0640706 1/1979 U.S.S.R. .

OTHER PUBLICATIONS

Manitowoc—VFDD Series-II, "Vertical Flail Delimber/Debarker".

*Primary Examiner*—W. Donald Bray
*Attorney, Agent, or Firm*—Wells, St. John, Roberts, Gregory & Matkin

[57] ABSTRACT

A log debarking chain flail apparatus 10 is illustrated in FIGS. 1 and 2 removing bark from a log 12. The apparatus includes two opposing flail assemblies 18 and 20 having a plurality of chain flails 22 that extend radially outward as the assembly is rotated. Each of the chain flails include a plurality of chain links extending from an inner end 22a to an outer end 22b in which each of the links has a longitudinal segment 46. A tooth 50 is formed on one or more of the longitudinal segments 46 for scraping and/or cutting the bark from the exterior 14 of the log 12.

17 Claims, 3 Drawing Sheets

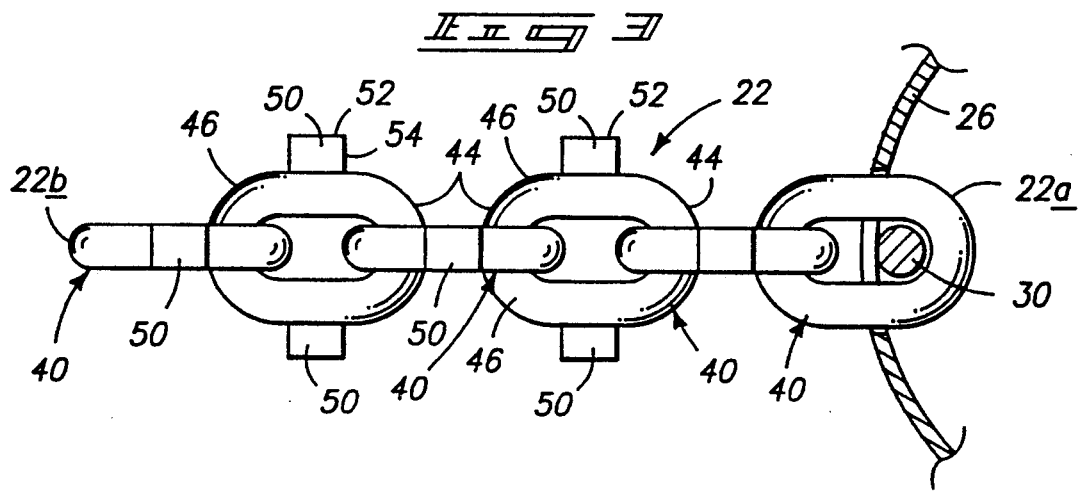
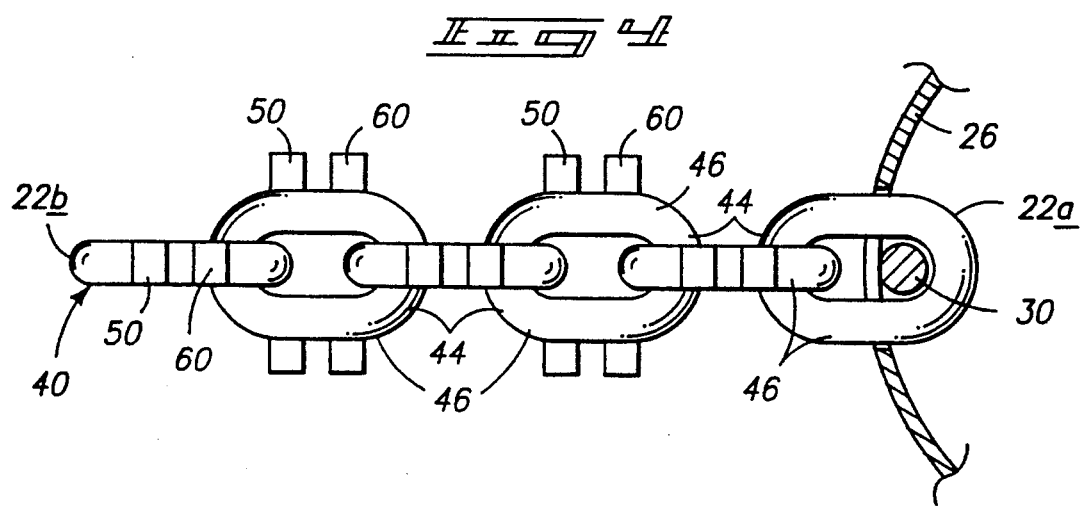
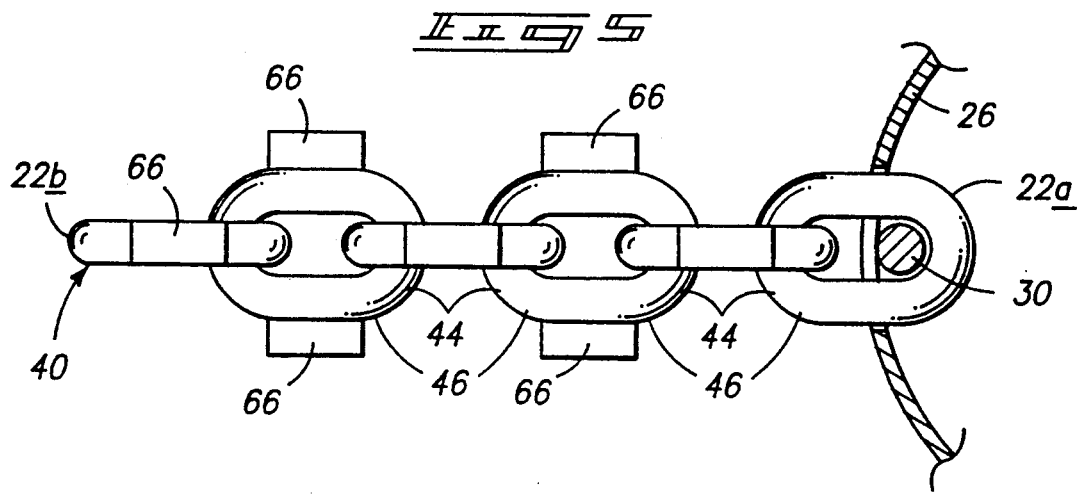

5,293,916

1

LOG DEBARKING CHAIN FLAIL AND APPARATUS

TECHNICAL FIELD

This invention relates to log debarking chain flails and apparatus using such flails for debarking/delimbing tree trunks.

BACKGROUND OF THE INVENTION

Chain flails have been used for many years in forestry equipment for removing bank from tree logs and tree trunks.

Apparently, one of the earlier debarking apparatus used for removing bark from tree trunks is disclosed in the F. E. Hummel U.S. Pat. No. 1,670,723 granted May 22, 1928. Such an apparatus shows the use of flail cylinders that are rotated to move flexible chain flail elements into the path and along the surface of the logs or slabs to remove the bark.

Such systems have been particularly useful in removing bark from logs or trunks that are subsequently cut into chips for use in the making of wood pulp products.

The use of chain flails for removing bark has been quite effective particularly for removing bark from softwoods. However, chain flails have had erratic performance for removing bark from the trunks and logs of hardwood trees and from trees that have suffered fire damage in forest fires. Wood chip manufacturers have been particularly conscious of the need to remove as much bark as possible to minimize the amount of bark in the pulp chips in order to obtain the highest prices possible from the wood pulp manufacturer. If a load of wood chips has too high a percentage of chips containing bark, then the chip receives a considerably lower price. Consequently, there has been a substantial need in the market for devices that improve the performance of removing bark from logs and trunks particularly hardwood logs or those that have been subjected to fire damage.

The principal object and advantage of this invention is to provide a chain flail that significantly increases the performance of chain flails in removing bark from logs and trunks particularly hardwood logs and logs that have been subjected to fire damage.

These and other objectives and advantages of this invention will become apparent upon reading the following detailed description of a preferred embodiment.

BRIEF DESCRIPTION OF THE DRAWINGS

Preferred embodiments of the invention are described below with reference to the accompanying drawings, which are briefly described below.

FIG. 3 is an enlarged detail plan view of one of the chain flail;

FIG. 4 is an enlarged detail plan view of an alternative embodiment of the chain flail;

FIG. 5 is an enlarged detail plan view of an alternative embodiment of the chain flail.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
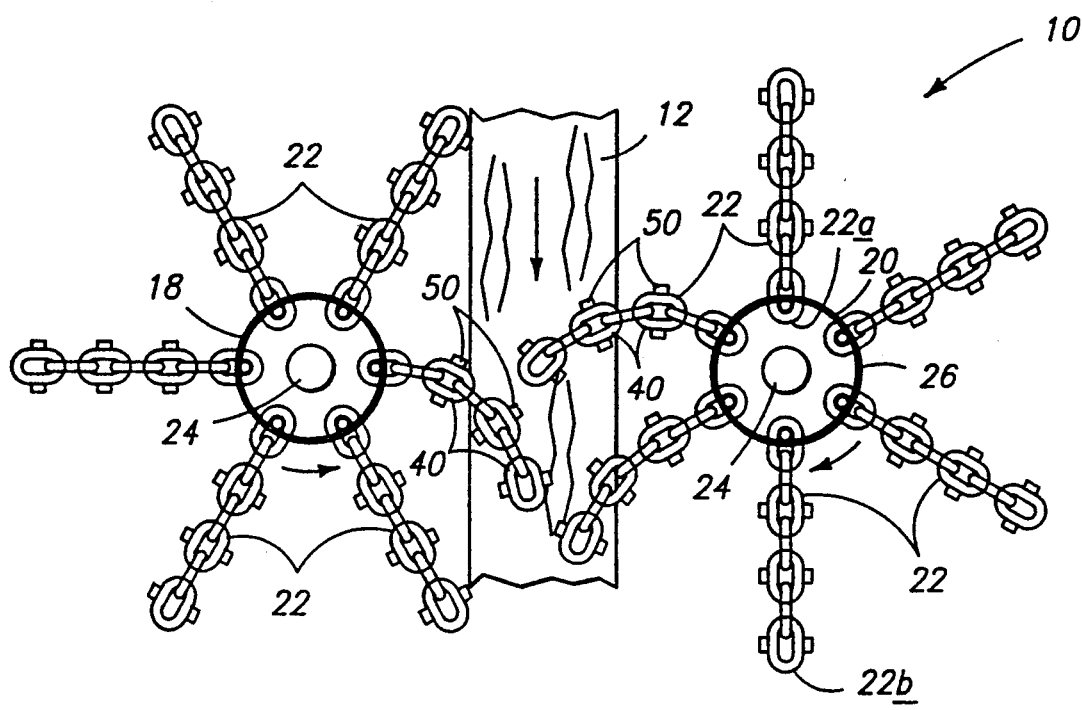
FIG. 1 is a diagrammatical plan view of a log debarking chain flail apparatus illustrating the movement of a log past the apparatus with a plurality of chain flails engaging the exterior of a log to remove bark therefrom.
Figure 2:
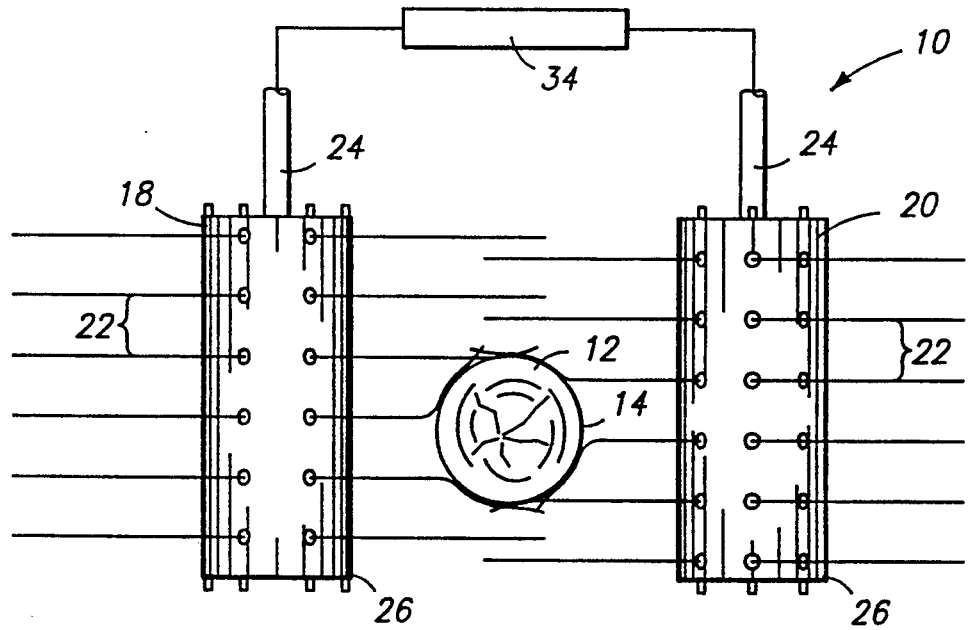
FIG. 2 is a diagrammatical rear elevational view of the log debarking chain flail apparatus depicted in FIG. 1 illustrating the flails engaging the exterior of the log to remove bark therefrom.

A log debarking chain flail apparatus is diagrammatically illustrated in FIGS. 1 and 2 and designated with the numeral 10 for removing bark from a tree log, trunk or slab 12 that contains bark on an exterior surface 14. The flail apparatus 10 in a preferred embodiment has two opposing flail assemblies 18 and 20, they are spaced apart a sufficient distance to enable the log, slab or trunk 12 to pass therebetween. Each of the assemblies 18 and 20 has a plurality of chain flails 22 for engaging and pounding the exterior 14 of the log 12 to remove, cut or dislodge the bark therefrom. Each of the plurality of chain flails 22 extend from an inner end 22a to an outer end 22b.

Each of the flail assemblies 18 and 19 include an upright shaft 24 that is operatively connected to a corresponding flail drum 26. The flail drum 26 includes a plurality of angularly and vertically spaced flail mounting apertures 28 formed therein for receiving the inner ends 22a of the plurality of chain flails 22 as illustrated in FIGS. 1 and 3. Each of the assemblies 18, 20 include releasable holding elements or rods 30 that extend longitudinally along the inner perimeter of the drum for releasably securing the inner ends 22a of the flexible chain flails 22 to the drums for rotation with the drum 26. Each of the flail assemblies 18 and 19 is driven by an apparatus drive 34 that is operatively connected to the shafts 24 for rotating the shafts in opposing directions as indicated by the directional arrows, illustrated in FIG. 1.

FIG. 3 illustrates an expanded detail view of one of the chain flails 22. Each of the chain flails 22 includes a plurality of interconnected cable chain links 40 that are looped together to form the flexible chain flail that extends from the inner end 22a to the outer end 22b. As each drum 26 rotates, the flails 22, through centrifugal force, are directed outwardly in a substantial radial direction from the shaft 24. Each of the chain links 40 is formed of cable or hoist chain link material that is generally described in ASTM Standard 56-39. Each of the chain links 40 is formed in an oblong continuous loop having curved transverse segments 44 and integral longitudinal segments 46. Each of the curved transverse segments 44 interconnects and interlocks with corresponding transverse segments 44 of adjacent links 40 to form a chain flail 22.

Each of the longitudinal segments 46 extends between the transverse segments 44 forming the enclosed loop. The longitudinal segments 46 extend in the longitudinal direction of the flail. Each link 40 has a prescribed center-to-center distance. Preferably each link 40 is of the same size and has the same center-to-center distance. Also, each link 40 has a prescribed thickness dimension that is rather constant about the loop. The chain links 40 extend from an inner link at the inner end 22a to an outer link at the outer end 22b.

At least one of flails 22 has a link 40 with a bark removal tooth 50 formed thereon for engaging, scraping and/or cutting the exterior 14 of the log 12 to remove the bark. The cutting tooth 50 is affixed on one of the longitudinal segments 46 as illustrated in FIGS. 3–6. In a preferred embodiment, a tooth 50 is formed or affixed on each of the longitudinal segments 46 of at least one of the chain links 40. Most preferably, a tooth 50 is formed on each of the chain flails 22 at least on the outer links.

It should be noted in FIG. 3 that each of the outer links has teeth 50 formed on the longitudinal segments 46 for engaging and scraping the exterior surface of the log. It has been found that the use of the teeth 50 on the transverse segments 46 dramatically increases the efficiency of removing the bark from the exterior 14 of logs 12, particularly those logs of the hardwood trees or from trees that have been subjected to fire damage. Each of the teeth 50 extends laterally outward to a distance greater than one-half of the thickness of the link material. Each cutting tooth 50 extends outward along side surfaces 54 to an outer surface 52.

In an alternative embodiment illustrated in FIG. 4, two teeth 50 and 60 are formed on the longitudinal segments 46 to increase the effective cutting surface against the exterior 14 of the log 12. In each of the configurations shown in FIG. 3 and 4, the cutting teeth 50 and 60 have a dimension in the longitudinal direction of the chain flail that is less than one-half of the center-to-center distance between the links 40.

In a further embodiment, illustrated in FIG. 5, a wide tooth 66 is formed on the longitudinal segments 46. In this case, the longitudinal dimension of the wide tooth 66 is greater than one-half of the center to center link distance. The tooth 66 extends laterally outward a distance greater than one-half of the thickness of the link material.

Figure 6:
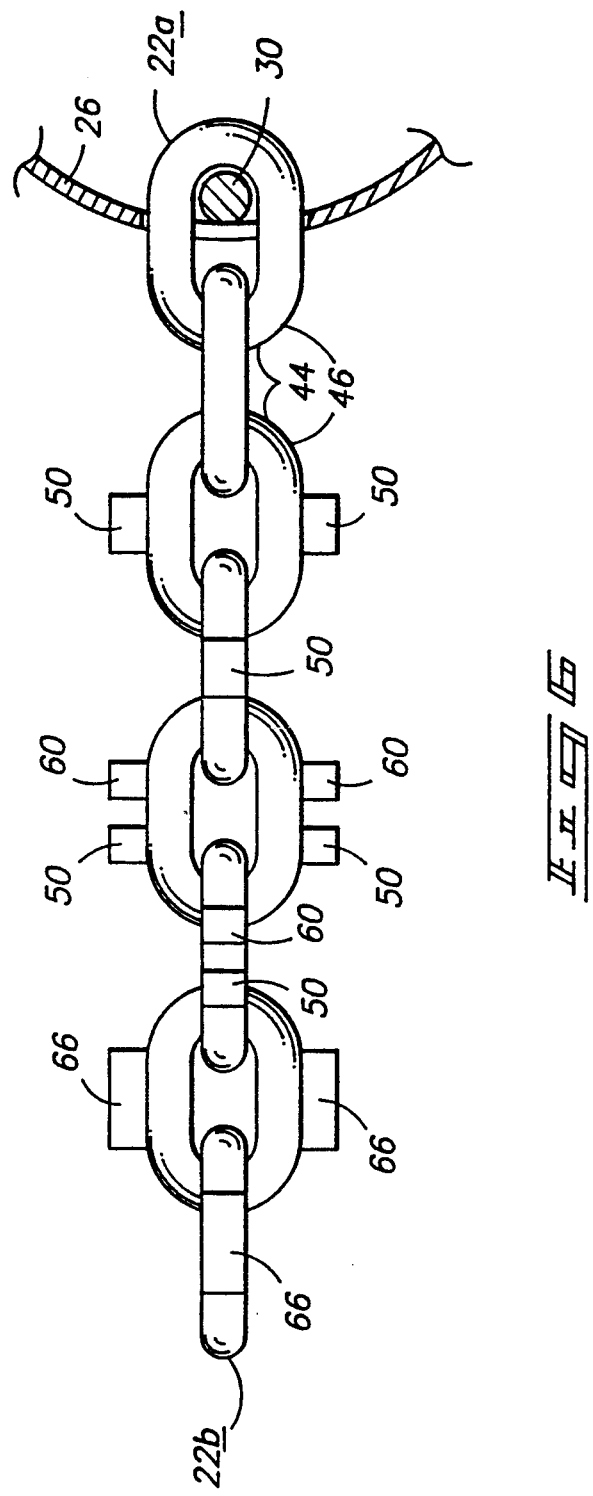
FIG. 6 is an enlarged detail plan view of an alternative embodiment of the chain flail.

For some applications, it may be desirable to utilize chain flails having a variety of tooth configurations as illustrated in FIG. 6. For example, on two of the links 40, a single cutting tooth 50 is formed on each longitudinal segment 46. However, on the next two outer links, two teeth 50 and 60 are formed on each of the longitudinal segments 46. On the outer two chain links, a wide tooth 66 is formed on the longitudinal segments 46.

Furthermore, it may be desirable to mix and match tooth configurations with respect to the type of wood material. For example, it may be desirable that a certain number of the flails have no teeth where other flails have the single tooth configuration illustrated in FIG. 3. However, in other applications it may be desirable to utilize the double tooth configuration illustrated in FIG. 4. Still further applications may call for the use of the wide tooth configuration illustrated in FIG. 5. Further applications may call for the use of a variety of tooth configurations on each flail as illustrated in FIG. 6.

Consequently, the present invention enables the operator to adjust the ability of the chain flails to remove bark depending upon the type of log material being processed. This greatly increases the flexibility for the operator to obtain maximum removal of the bark while at the same time minimizing the removal of non-bark wood from the exterior 14. The present invention enables a person in the field to readily adjust the debarking and delimbing process depending upon the type of log material being processed. This greatly enhances the ability of the operator to maintain quality of the product to assure obtaining maximum chip prices, while at the same time maximizing the amount of recovered wood fiber.

In compliance with the statute, the invention has been described in language more or less specific as to methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A log debarking chain flail for engaging and dislodging bark material from the exterior of a log, comprising:
   a plurality of chain links interconnected together to form an elongated flail;
   each chain link being formed of a continuous loop having transverse segments that extend through and interconnect with adjacent chain links and longitudinal segments that extend in the elongated direction of the flail between adjacent chain links; and
   a first tooth rigidly affixed on at least a first longitudinal link segment and extending radially outward therefrom for engaging the exterior of the log to remove bark material from the exterior of the log.

2. The log debarking chain flail as defined in claim 1 wherein the flail further comprises a second tooth affixed to a second longitudinal link segment transversely opposite the first longitudinal link segment.

3. The log debarking chain flail as defined in claim 1 wherein the flail further comprises a second tooth affixed on the first longitudinal link segment adjacent to the first tooth.

4. The log debarking chain flail as defined in claim 1 wherein the plurality of interconnected chain links have a defined longitudinal center-to-center link distance and wherein the first tooth has a longitudinal tooth dimension that is less than one-half of the center-to-center link distance.

5. The log debarking chain flail as defined in claim 1 wherein the plurality of interconnected chain links have a defined longitudinal center-to-center link distance and wherein the first tooth has a longitudinal tooth dimension that is greater than one-half of the center-to-center link distance.

6. The log debarking chain flail as defined in claim 1 wherein at least a majority of the links each have a tooth affixed on a longitudinal segment thereof.

7. The log debarking chain flail as defined in claim 1 wherein a second longitudinal segment has two teeth affixed thereon.

8. The log debarking chain flail as defined in claim 1 wherein the first longitudinal segment has a prescribed thickness and where in the affixed tooth extends laterally outward a bit distance greater than one-half of the prescribed link segment thickness distance.

9. A log debarking chain flail apparatus for removing bark material from the exterior of a log, comprising:
   opposing flail assemblies that are spaced apart a distance sufficient to permit the passage of the log therebetween;
   each of the flail assemblies having a plurality of spaced chain flails extending therefrom into a path of the log as the log passes between the opposing flail assemblies;
   each of the chain flails being formed by a plurality of interconnected chain links;

each chain link being formed of a continuous loop having transverse segments that extend through and interconnect with adjacent chain links and longitudinal segments that extend in the elongated direction of the flail between adjacent chain links;

a first tooth affixed on at least a first longitudinal link segment; and a flail drive operatively connected to the flail assemblies for moving the assemblies with sufficient velocity to direct the chain flails with the tooth against the exterior of the log to remove bark material from the exterior of the log.

10. The log debarking chain flail assembly as defined in claim 9 wherein the flail further comprises a second tooth affixed to a second longitudinal link segment transversely opposite the first longitudinal link segment.

11. The log debarking chain flail apparatus as defined in claim 9 wherein the flail further comprises a second tooth affixed on the first longitudinal link segment adjacent to the first tooth.

12. The log debarking chain flail apparatus as defined in claim 9 wherein the plurality of interconnected chain links have a defined longitudinal center-to-center link distance and wherein the first tooth has a longitudinal tooth dimension that is less than one-half of the center-to-center link distance.

13. The log debarking chain flail apparatus as defined in claim 9 wherein the plurality of interconnected chain links have a defined longitudinal center-to-center link distance and wherein the first tooth has a longitudinal tooth dimension that is greater than one-half of the center-to-center link distance.

14. The log debarking chain flail apparatus as defined in claim 9 wherein at least a majority of the links each have a tooth affixed on a longitudinal segment thereof.

15. The log debarking chain flail apparatus as defined in claim 9 wherein a second longitudinal segment has two teeth affixed thereon.

16. The log debarking chain flail apparatus as defined in claim 9 wherein the first longitudinal segment has a prescribed thickness and where in the affixed tooth extends laterally outward a bit distance equal to or greater than the prescribed link segment thickness distance.

17. The log debarking chain flail apparatus as defined in claim 9 wherein each of the chain links are oblong in the longitudinal direction of the flail.

* * * * *